United States Patent [19]

Lipkins

[11] 4,065,204
[45] Dec. 27, 1977

[54] LATERAL TRANSFER RETROREFLECTORS

[76] Inventor: Morton S. Lipkins, 3 Nemeth St., Malverne, N.Y. 11565

[21] Appl. No.: 653,479

[22] Filed: Jan. 29, 1976

Related U.S. Application Data

[63] Continuation-in-part of Ser. No. 475,133, May 31, 1974, Pat. No. 3,936,194.

[51] Int. Cl.² .............................................. G02B 5/122
[52] U.S. Cl. ..................................... 350/102; 356/153
[58] Field of Search ............ 356/106 R, 153, 106 LR, 356/135, 110, 138; 350/102, 300, 288, 299, 285, 286

[56] References Cited

U.S. PATENT DOCUMENTS

| 3,442,578 | 5/1969 | Baker ................................... 350/286 |
| 3,447,859 | 6/1969 | Giesecke ................................ 350/300 |
| 3,552,834 | 1/1971 | Vogel et al. .......................... 350/285 |
| 3,663,084 | 5/1972 | Lipkins ................................. 350/102 |

OTHER PUBLICATIONS

Dobychin, Double-Image Focus Correctors, Soviet Journal of Optical Technology, vol. 35, No. 6, Nov.--Dec. 1968, pp. 714-718.

Primary Examiner—John K. Corbin
Assistant Examiner—B. W. delos Reyes

[57] ABSTRACT

The disclosed lateral transfer retroreflectors include three flat reflectors, two of them being united at right angles to form a hollow roof reflector, and a third being carried on a central member at the required offset distance from the roof reflector and in a plane perpendicular to each of the first two reflectors. The parts are related to each other in two embodiments which enable adjustment of the planes of the flat reflectors relative to each other without exacting requirements as to right-angled edges of any of the flat reflectors or as to parallelism of end faces of the central member.

8 Claims, 7 Drawing Figures

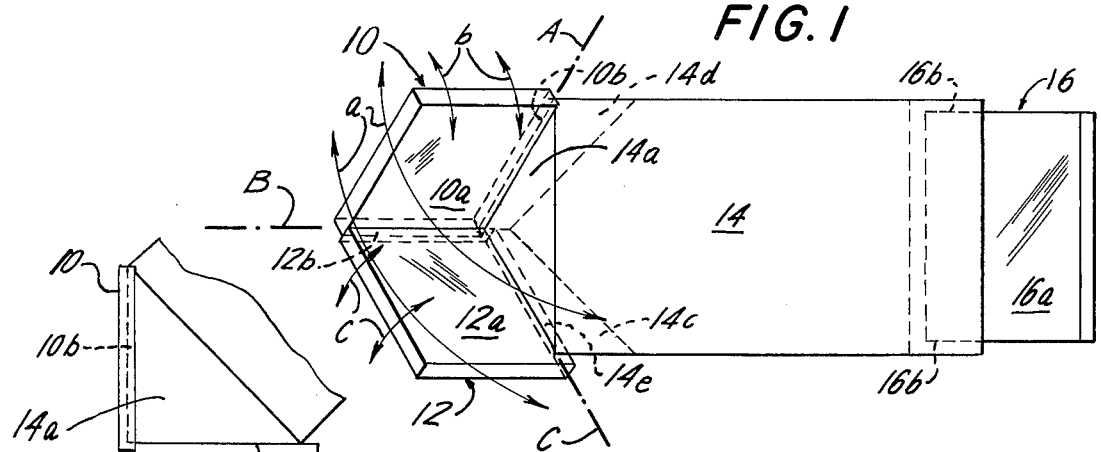
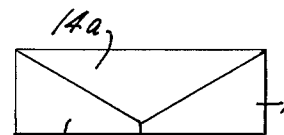
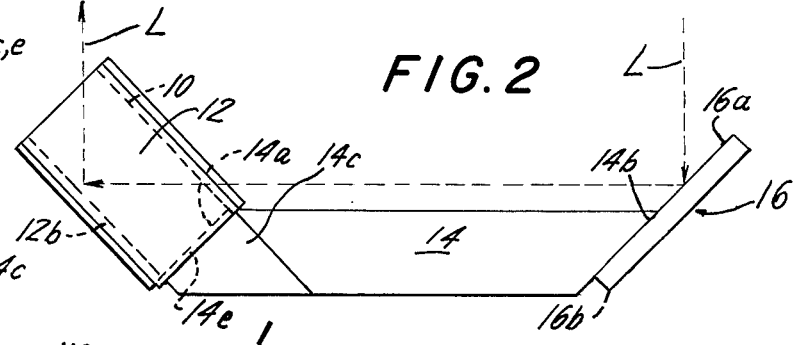
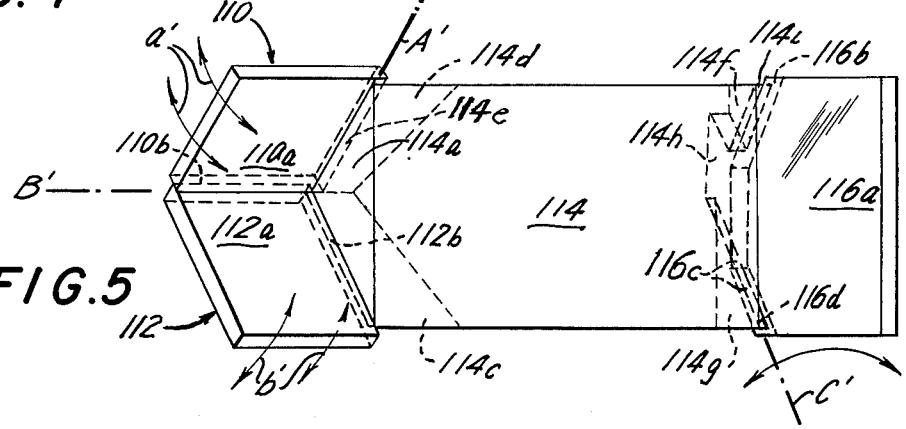
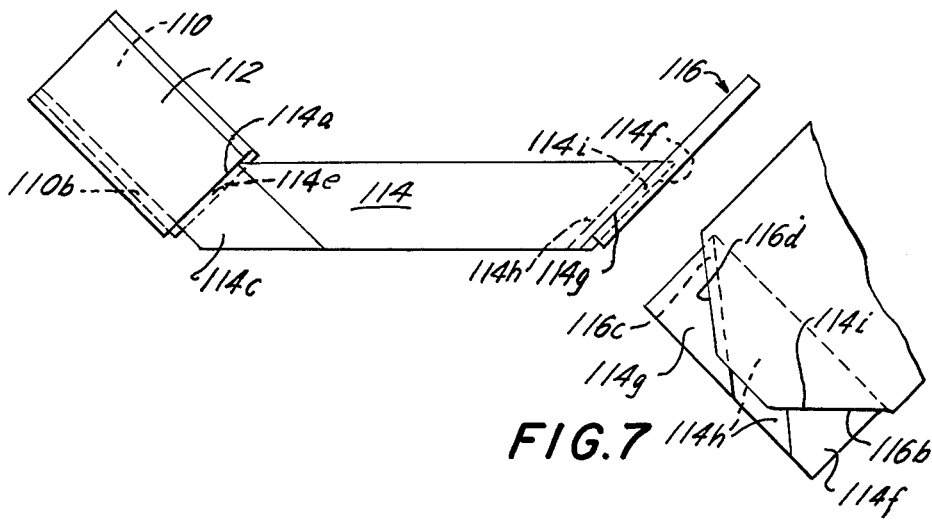

LATERAL TRANSFER RETROREFLECTORS

This is a continuation-in-part of my copending application Ser. No. 475,133, filed May 31, 1974 now U.S. Pat. No. 3,936,194

FIELD OF THE INVENTION

This invention relates to lateral transfer retroreflectors.

BACKGROUND

Retroreflectors as in my U.S. Pat. No. 3,663,084 have the property of returning an incident beam of light to its source. Lateral transfer retroreflectors reflect an incoming ray laterally through an offset distance and then reversely, parallel to the incoming ray. Such devices include two flat reflecting surfaces at right angles to each other forming a roof reflector and a third at right angles to each of the first two, displaced from the roof reflector by the required offset distance. Characteristically, the incoming ray and the outgoing ray are parallel without concern as to the exact relationship of the device to the path of the incoming ray.

The three flat reflecting surfaces could be formed on a single piece of glass, but at great cost because of the difficulty of making the three optically flat surfaces at right angles to each other, especially where there is a large lateral transfer distance. The device could more readily be fabricated of three separate flat reflecting plates and a central spacing number. Two of the plates could form a roof reflector, and the third reflecting plate could be carried by the central member at a distance from the roof reflector. However, many exacting requirements must still be met as to the shapes of some of the parts and as to the relationships of certain edges and surfaces of the parts.

SUMMARY OF THE INVENTION

Three plates having flat reflecting usually aluminized faces are here united to a central member in two embodiments that enable adjustment of their planes into mutual perpendicularity.

In a first configuration, first and second plates which are disposed at one slant end face of the central member to form a hollow roof reflector, represent three parts that are assembled so that one edge of each of these parts abuts against a marginal face portion of another part, and that edge of each of these members is perpendicular to its marginal face portion that is abutted by another of these parts. The third reflecting plate is fixed to the second slant end of the central member. Each of the three parts at one end of the central member can then be adjustably tilted in relation to the other two during assembly and then fixed in adjustment by cement. The mutual perpendicularity of the planes of all three flat reflecting plates can be established without depending on the adjustment or the adjustability of the third plate in relation to the central member.

In a second configuration, the relationship of the parts at the roof-reflector end of the central member is the same as in the first configuration, but there is no reliance placed on the fact that the central member can be adjusted in relation to the two plates forming the roof reflector. Instead, the third plate is supported along a marginal portion of its face on a ledge at the second end of the central member for providing the third tilting adjustment to establish mutual perpendicularity of all three reflecting plates. An edge of the third plate, perpendicular to its marginal face portion, wipes across a support face during the adjustment. Cement along two edges fixes the plate to the ledge and the supporting face in the established adjustment.

In both embodiments (described in detail below) the face of each of the plates of the roof-reflector is abutted by another part only along one of its margins. This characteristic has the first advantage of facilitating adjustment of the plate, and it has the second advantage of having a minimized tendency of becoming warped during curing of the cement along two of its edges. In the second configuration briefly described above, not only the roof-reflector plates but also the third plate has these advantages.

As to both embodiments, there is no need for precise angles between two edges of any of the plates, and there is no need for precise parallelism between the end faces of the central member.

ILLUSTRATIVE EMBODIMENTS

The nature of the invention and its various features will be better appreciated from the following detailed description of the illustrative embodiments in which reference is made to the accompanying drawings. In the drawings:

FIG. 1 is a top plan view of a novel lateral transfer retroreflector as a first presently preferred illustrative embodiment of various aspects of the invention;

FIG. 2 is a lateral view of the device of FIG. 1;

FIG. 3 is a fragmentary view of the device of FIGS. 1 and 2 as seen from above and to the left of FIG. 2;

FIG. 4 is a left-hand end view of the central member of the device of FIGS. 1–3;

FIG. 5 is the top plan view of another lateral transfer retroreflector as a second, presently preferred illustrative embodiment of various aspects of the invention;

FIG. 6 is a lateral view of the device in FIG. 5; and

FIG. 7 is a fragmentary view of the device in FIGS. 5 and 6, as viewed from below and to the right of FIG. 6.

Referring now to FIGS. 1–4, a hollow lateral transfer retroreflector is shown, including first and second reflecting plates 10 and 12 united with their flat reflecting faces disposed at right angles. Plates 10 and 12 constitute a hollow roof-reflector. Plates 10 and 12 are united to a first slant end of a central member 14, and a third reflecting plate 16 is secured to a second slant end of member 14 generally parallel to said first slant end. Plates 10, 12 and 16 have optically flat reflecting flaces 10a, 12a and 16a disposed in mutually perpendicular planes for directing an incoming ray incident at any one of them to the other two in succession so as to reflect the incoming ray along an outgoing path parallel to the incoming ray, as represented by light path L.

The first end of member 14 has a slant flat face 14a, extending generally parallel to the second slant end face 14b. Face 14a is flat, but need not be flat to optical standards. A marginal portion of reflecting face 10a along one edge of plate 10 is abutted by an edge 12b of plate 12. A second edge 10b of plate 10 abuts a margin of slant face 14a of member 14. Member 14 is relieved at area 14d, providing a surface that intersects face 14a. This margin of face 14a extends along edge 10b between the front and rear faces of plate 10. Member 14 has a relieved region 14c which need not extend far from face 14a. Face 14c which intersects face 14a is essentially flat and perpendicular to faces 14a and 14d. Margin 14e of face 14c abuts a marginal portion of reflecting face 12a of plate 12. Accordingly, the plane of plate 10 can be adjusted along arc *a* about an axis A, carrying plate 12 with it. Roof-reflector plate 12 is carried with plate 10 during this adjustment and moves in wiping contact with edge 14e. (This may alternatively be considered an adjustment of member 14 about axis A in relation to plates 10 and 12.) Plate 10 is adjustable about axis B along arcs *b* for establishing perpendicularity of reflecting face 10a in relation to face 12a. Edge 10b remains in wiping contact with face 14a during this adjustment. Plate 12 is adjustable along arc *c* about axis C. Edge 12b remains in wiping contact with face 10a of plate 10 during this adjustment. Face 14a is involved only mechanically in these adjustments. The adjustments are to establish mutual perpendicularity of each of the reflecting plates 10, 12 and 16 in relation to the others. Plate 16 may be secured to member 14 as a preliminary operation. The foregoing adjustment is performed in a rough way at first, and perfected by checking the optical performance of the device.

When the adjustment is completed, each member 10, 12 and 14 is united to each of the other as by a bead of epoxy cement along what is here called "hollow corners" formed by an edge surface of each plate and the adjacent perpendicular surface. Thus a bead of cement can be applied along the hollow corner formed by the edge surface 10b and region 14d, and a bead of cement is applied along "inside corner" 15 (FIG. 3), i.e., along edge surface 12b and to the perpendicular edge surface of plate 10. Finally, a bead of cement can be applied to surface 14c and to the perpendicular edge surface of plate 12. Some cement is drawn by capillary action between the abutting areas of the parts, contributing to the strength of the bond.

Plate 16a is united to slant face 14b by applying beads of cement along the hollow corners where the plane of face 14b is intersected by edge surfaces 16b. During curing of the cement, there is a tendency of the cement to pull plate 16 against face 14b. To avoid warping of plate 16, face 14b should be made truly flat.

There is no exacting requirement of any precise relationship between slant end faces 14a and 14b of member 14. There is no requirement that any plate is to have two intersecting edges precisely at right angles to each other. And yet all the right-angled relationships of the reflecting faces are readily established to the required high standard of accuracy. The surfaces of plates 10 and 12 and member 14 that are to be joined remain in contact during the adjustment, for application of all three beads of cement when the adjustment is done.

An alternative construction is shown in FIGS. 4 to 7. Numbers of the "100" series are used, corresponding to the number of FIGS. 1–4. In general, the description of FIGS. 1 to 4 applies to the device in FIGS. 5 to 7.

Plates 110 and 112 have flat reflecting faces 110a and 112a. Both plates have edge surfaces 110b and 112b, respectively, that are essentially flat and perpendicular to the reflecting faces. Edge surface 110b abuts a marginal strip of the face 112a of plate 112. A marginal area of reflecting face 110a is abutted by a marginal area of lateral surface 114d of central member 114. Surface 114d and edge surface 10b form an "inside corner" where a bead of cement may be applied. Surfaces 114a, 114c and 114d are essentially flat and essentially perpendicular to one another. Plate 110 is adjustable about axis A', to swing along arcs *a'*, for establishing perpendicularity between reflecting faces 110a and 116a. During this adjustment, edge surface 110b wipes across the faces 112a of plate 112. Plate 112 is adjustable about axis B' to swing along arcs *b'* for establishing perpendicularity between faces 110a and 112a. Edge surface 112b remains in wiping contract with face 114a during this adjustment. Surface 114c and edge surface 112b form an inside corner where cement may be applied.

The slant second end of central member 114 is prepared with two raised areas 14f and 114g, relative to a recessed area 114h, all approximately parallel to each other. Area 114g is perhaps 0.050 inch above recessed area 114h. Area 114f may be 0.100 inch above area 114h. an essentially flat lateral edge surface 114i of area 114f perpendicular to areas 114f and 114h abuts an edge 116b of plate 116. In this example, plate 116 should be appreciably thicker than 0.050 inch, allowing for a cement fillet or bead to be applied along the hollow corner formed by raised area 114f along edge surface 114i and the abutting edge surface 116b of plate 116. Plate 116 has a marginal portion 116c overlying a corresponding marginal portion of surface 114g when the angle of plate 116 is being adjusted about axis C' for adjusting perpendicularity of the reflecting faces of plates 112 and 116. During this adjustment, edge 116b wipes across lateral surface or edge 114i of area 114f.

Edge surface 114i and edge surface 116b form a hollow corner, and similarly edge surface 116d (perpendicular to reflecting face 116a) and area 114g form a hollow corner. When all three plates are in adjustment, beads of suitable cement such as epoxy cement are applied to the various hollow corners along the edges of the plates and the adjustments are maintained during curing of the cement.

The reflecting faces of plates 110, 112 and 116 each has only one margin that bears against a surface, namely the surface about which that plate tilts during the adjustment. This is an important factor that eliminates one potentially serious cause of warping of the plates, such as might be caused during the curing of cement extending along edges 16b (FIG. 1) in case end surface 14b were not made flat with extacting accuracy. A similar effect is present, to a lesser extent, where a marginal area along a single edge of a reflecting face bears against a marginal area of a supporting surface. With this in mind, each such supporting surface should be made flat to reasonably high standards. However, by limiting the bearing of the reflecting face of any one plate to the margin along only one edge, the problem of warping due to cement is minimized. The beads of cement are narrow, compared to the widths of the edge surfaces of the plates as determined by the thickness of the plates. As to each plate 10 and 12 of FIG. 1, and as to all three plates in FIG. 5, one of its edge surfaces abuts the surface to which it is cemented and its other cemented edge imposes primarily a shear stress on its cement. These considerations contribute to minimized tendency of warping of the plates during curing of the cement.

The illustrative embodiments of the invention in its various aspects as detailed above and shown in the drawings are susceptible of varied application and modification, and consequently the invention should be construed broadly in accordance with its full spirit and scope.

I claim:

1. A hollow lateral transfer retroreflector, including first and second flat reflector plates disposed to form a roof reflector, a third flat reflector plate, and a central member having first and second opposite ends, each of the flat reflector plates forming the roof reflector being united along two essentially perpendicular edges thereof to said one end of said central member and to the other of said two plates, respectively, and said third flat reflector plate being united to said second end of the central member, the faces of said flat reflector plates being disposed in mutually perpendicular planes, said two edges of each of the roof reflector plates providing edge surfaces, only one of said two edge surfaces being in engagement with a surface of another part of the hollow lateral transfer retroreflector, enabling each said edge surface and said surface engaged thereby to be maintained in mutual contact and in condition to be united through a range of mutual angular adjustments of the roof reflector plates before the parts are united.

2. A hollow lateral transfer retroreflector, including first and second reflector plates having reflecting flat faces disposed to from a roof reflector, a third reflector plate having a reflecting flat face, and a central member, said third plate being united to a first portion of the central member and being disposed in relation to said roof reflector to constitute therewith a hollow lateral transfer retroreflector, a second portion of said central member spaced from said first portion having a mounting flat face parallel to the reflecting face of said third reflector plate, an edge of said second reflector plate abutting said mounting flat face, an edge of the first reflector plate abutting the reflecting flat face of said second reflector plate, and said mounting face having an edge abutting the reflecting flat face of said first reflector plate, each of said first and second reflector plates and said central member being united where they abut one another.

3. A hollow lateral transfer retroreflector in accordance with claim 2, wherein said third flat reflector plate is polygonal and a margin of the reflecting face thereof along only one of its edges is fixed against the central member.

4. A hollow lateral transfer retroreflector in accordance with claim 2, wherein said third reflecting plate has two approximately perpendicular edges and said central member has a portion engaging a margin of the reflecting face of the third plate along one of said two edges thereof and said central member has another portion providing a face abutted by the edge surface of said third plate along the second of said two edges for enabling pivotal adjustment of the third plate while both of said two edges remain in condition for application of cement before the third plate is united to the central member.

5. A hollow lateral transfer retroreflector in accordance with claim 2 wherein, before the first and second reflector plates and the central member are united as aforesaid, each said edge and the flat face engaged thereby are adapted to be maintained in mutual contact and thus in condition to be united throughout a range of wiping adjustment.

6. A hollow lateral transfer retroreflector in accordance with claim 2 wherein, before the parts are united as aforesaid, each edge and face in abutment provides a pivotal axis of angular adjustment and wherein each said edge can be held in wiping contact with the flat face which it abuts so that unifying cement can be applied to the aforesaid parts where they abut one another when in their desired adjustment.

7. A hollow lateral transfer retroreflector in accordance with claim 2 wherein each of three of said parts, namely said first and second plates and said second portion of said central member, has one edge surface intersecting and thus bounding its flat face where that flat face is abutted by another of said parts as aforesaid and each such part has a second edge surface constituting the aforesaid edge, each said second edge surface intersecting and thus bounding its flat face where that part abuts the other part, each said first edge surface and a related one of said second edge surfaces forming a hollow corner at which cement may be applied when the parts are in proper adjustment.

8. A hollow lateral transfer retroreflector in accordance with claim 2, wherein said first portion of said central member has a further flat face approximately parallel to said mounting flat face, the further flat face terminating along a edge providing an axis extending approximately parallel to said edge of said second reflector plate, said first portion of the central member having a shoulder approximately at right angles to said axis and spaced from said further flat face, said third reflector plate having an edge abutting said shoulder for enabling the third reflector plate to be adjusted relative to said central member about said axis while an edge of the third plate wipes across said shoulder in preparation for uniting said third reflector plate to said central member.

* * * * *